(12) United States Patent
Dhammawat et al.

(10) Patent No.: US 11,240,661 B2
(45) Date of Patent: Feb. 1, 2022

(54) SECURE SIMULTANEOUS AUTHENTICATION OF EQUALS ANTI-CLOGGING MECHANISM

(71) Applicant: Cisco Technology, Inc., San Jose, CA (US)

(72) Inventors: Abhishek Dhammawat, San Jose, CA (US); Mansi Jain, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 218 days.

(21) Appl. No.: 16/559,048

(22) Filed: Sep. 3, 2019

(65) Prior Publication Data
US 2021/0067961 A1    Mar. 4, 2021

(51) Int. Cl.
| | | |
|---|---|---|
| *H04W 12/06* | (2021.01) | |
| *H04W 12/10* | (2021.01) | |
| *H04W 12/04* | (2021.01) | |
| *H04W 80/02* | (2009.01) | |
| *H04L 9/32* | (2006.01) | |
| *H04L 9/08* | (2006.01) | |
| *H04W 12/041* | (2021.01) | |

(52) U.S. Cl.
CPC ........... *H04W 12/06* (2013.01); *H04L 9/0825* (2013.01); *H04L 9/0841* (2013.01); *H04L 9/3213* (2013.01); *H04W 12/041* (2021.01); *H04W 80/02* (2013.01)

(58) Field of Classification Search
CPC ... H04W 12/06; H04W 12/041; H04W 80/02; H04L 9/0825; H04L 9/0841; H04L 9/3213

USPC ............................................................ 726/4
See application file for complete search history.

(56) References Cited

U.S. PATENT DOCUMENTS

| | | | |
|---|---|---|---|
| 6,948,074 B1 * | 9/2005 | Borella | H04L 63/1458 726/14 |
| 8,433,918 B2 | 4/2013 | Ho | |
| 9,130,754 B2 * | 9/2015 | Abraham | H04L 9/0844 |
| 9,433,022 B2 | 8/2016 | Park et al. | |
| 9,774,593 B2 | 9/2017 | Gast | |

(Continued)

OTHER PUBLICATIONS

Tschachn, WPA3 Dragonfly Handshake, Nov. 2018, https://sarwiki.informatik.hu-berlin.de/index.php?title=WPA3_Dragonfly_Handshake&oldid=13325, 13 pages (Year: 2018).*

(Continued)

*Primary Examiner* — Haresh N Patel
(74) *Attorney, Agent, or Firm* — Merchant & Gould P.C.

(57) ABSTRACT

A secure Simultaneous Authentication of Equals (SAE) anti-clogging mechanism may be provided. A public key of an access point may be provided from the access point to a client attempting to connect with a network via the access point. The access point may receive from the client a first anti-clogging token and a public key of the client. The first anti-clogging token may be generated by the first client using a shared secret based on a private key of the client and the public key of the access point and a multiplier. The access point may generate a second anti-clogging token using a shared secret based on a private key of the access point and the public key of the client and the multiplier. The access point may then verify the first anti-clogging token and the second anti-clogging token match to authenticate the client.

20 Claims, 7 Drawing Sheets

(56) References Cited

U.S. PATENT DOCUMENTS

| | | | |
|---|---|---|---|
| 2009/0199002 A1* | 8/2009 | Erickson | H04L 9/3271 |
| | | | 713/171 |
| 2012/0151566 A1* | 6/2012 | Lin | H04L 9/0838 |
| | | | 726/7 |
| 2015/0127949 A1 | 5/2015 | Patil et al. | |
| 2016/0269393 A1* | 9/2016 | Corella | G06F 21/33 |
| 2018/0278584 A1* | 9/2018 | Kuperman | H04L 9/3236 |
| 2018/0332471 A1* | 11/2018 | Zhu | H04L 63/061 |
| 2019/0097794 A1* | 3/2019 | Nix | H04L 9/0662 |
| 2019/0261168 A1* | 8/2019 | Shi | H04W 12/0471 |
| 2020/0228974 A1* | 7/2020 | Miyake | H04W 12/77 |

OTHER PUBLICATIONS

Sivanagaswathi Kallam, Diffie-Hellman: Key Exchange and Public Key Cryptosystems, Math and Computer Science Department Indiana State University, Sep. 30, 2015, 27 pages.

Anonymous Author(s). 2018. Here be Dragons: A Security Analysis of WPA3's SAE Handshake. In Woodstock '18: ACM Symposium on Neural Gaze Detection, Jun. 3-5, 2018, Woodstock, NY. ACM, New York, NY, USA, 15 pages. https://doi.org/10.1145/1122445.1122456.

Mathy Vanhoef and Eyal Ronen, Dragonblood: A Security Analysis of WPA3's SAE Handshake, Cryptology ePrint Archive, Report 2019/383, Apr. 2019, 16 pages. https://eprint.iacr.org/2019/383/20190416:032828.

Mathy Vanhoef and Eyal Ronen, Dragonblood: Analyzing the Dragonfly Handshake of WPA3 and EAP-pwd, Cryptology ePrint Archive, Report 2019/383, Apr. 2019, 17 pages. https://eprint.iacr.org/2019/383/20190802:15151417.

* cited by examiner

SECURE SIMULTANEOUS AUTHENTICATION OF EQUALS ANTI-CLOGGING MECHANISM

TECHNICAL FIELD

The present disclosure relates generally to Simultaneous Authentication of Equals (SAE) anti-clogging mechanisms for wireless networks.

BACKGROUND

Wi-Fi Protected Access 3 (WPA3) is a security protocol and certification program developed by the Wi-Fi Alliance for wireless networks. WPA3-Personal utilizes Simultaneous Authentication of Equals (SAE), a secure password-based authentication, to authenticate a client attempting to connect to a wireless network via an access point. SAE may include an anti-clogging mechanism as a defense against denial-of-service attacks at the access point. The anti-clogging mechanism may be triggered when a number of SAE open sessions at the access point are greater than or equal to a threshold indicative of a potential attack. An anti-clogging token may be generated as part of the anti-clogging mechanism.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

A secure SAE anti-clogging mechanism may be provided. A public key of an access point may be provided from the access point to a client attempting to connect with a network via the access point. The access point may receive from the client a first anti-clogging token and a public key of the client. The first anti-clogging token may be generated by the client using a shared secret based on a private key of the client and the public key of the access point and a multiplier. The access point may generate a second anti-clogging token using a shared secret based on a private key of the access point and the public key of the client and the multiplier. The access point may then verify the first anti-clogging token and the second anti-clogging token match to authenticate the client.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Typical SAE anti-clogging mechanisms may involve the access point generating and transmitting the anti-clogging token to the client when the number of SAE open sessions at the access point are greater than or equal to the threshold indicative of a potential attack. The client is expected to transmit back to the access point (e.g., replay) the same anti-clogging token. When the access point receives the same anti-clogging token it initially transmitted to the client, the client may be authenticated.

It has been assumed an attacker is not intelligent enough to replay the anti-clogging token, and thus only genuine clients may be authenticated. However, this assumption is incorrect. The anti-clogging token transmitted from the access point to the client is unencrypted. Therefore, the attacker may intercept and store the anti-clogging token. In some examples, the attacker may intercept and store a plurality of anti-clogging tokens and transmit them back to the access point simultaneously for different client Media Access Control (MAC) addresses to simulate a plurality of clients accessing the network via the access point at a same. This may cause resource exhaustion, a form of denial-of-service attack, at the access point preventing legitimate clients from accessing the network.

Embodiments of the disclosure provide a more secure SAE anti-clogging mechanism to overcome the above-discussed vulnerabilities. For example, the client rather than the access point may generate an anti-clogging token for transmission to and verification by the access point. The verification process may include generation of another anti-clogging token by the access point that is then compared to the client-generated anti-clogging token to determine whether the tokens match. The anti-clogging tokens generated by each of the client and the access point may be a product of two variables, a shared secret and a multiplier. The shared secret may be an output of a Diffie-Hellman (DH) computation between the client and the access point using one of Finite Field Cryptography (FFC) or an Elliptic-Curve Cryptography (ECC). The multiplier may be a password seed computed using, among other values, a password that is known to the client and the access point, but not known to an attacker. Thus, even if the attacker attempts to generate an anti-clogging token under the guise of the client, the attacker-generated anti-clogging token will not be verified by the access point because it will lack the password of the multiplier preventing a match of the tokens.

Figure 1:
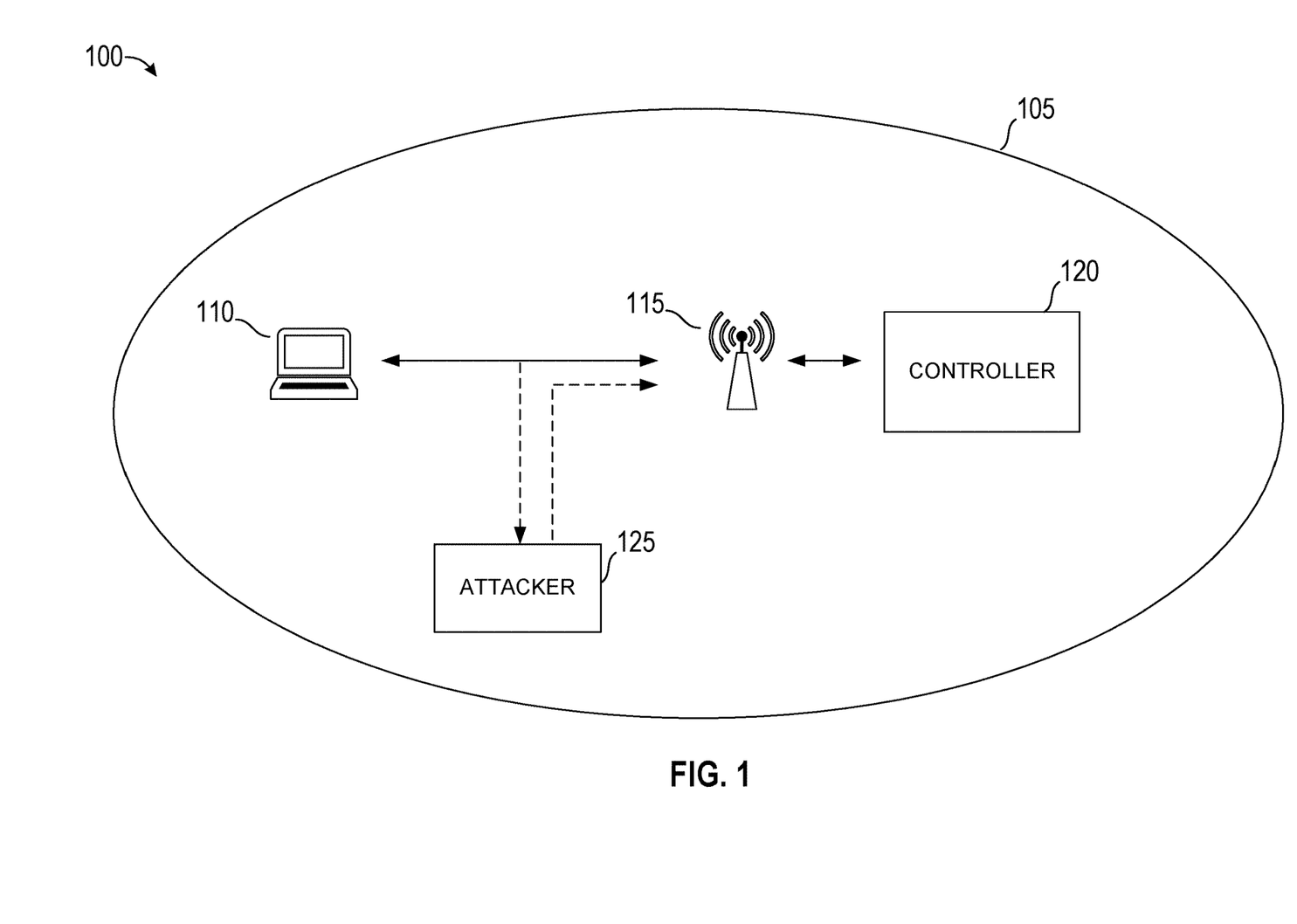
FIG. 1 shows an operating environment for an SAE anti-clogging mechanism.

FIG. 1 shows an operating environment 100 for an SAE anti-clogging mechanism. As shown in FIG. 1, operating environment 100 may comprise a network 105. Network 105 may comprise at least a client 110, an access point 115, and a controller 120. In some embodiments, network 105 may also comprise an attacker 125.

Network 105 may be a Wireless Local Area Network (WLAN) serving a defined area. Stations, including client 110 and access point 115, are components capable of connecting to network 105. For example, stations may be equipped with Wireless Network Interface Controllers (WNICs) that enable the connection to network 105. Access point 115 may be a networking hardware device that enables other devices, such as client 110, to connect to network 105. Client 110 may include a desktop computer, a laptop computer, a tablet computer, a smart phone, or wearable computing device, among other similar devices capable of accessing and using network 105 via access point 115.

Controller 120 may be a WLAN controller that manages and configures access point 115 of network 105, including configuring security protocols such as WPA3. WPA3-Personal may utilize SAE to authenticate clients, such as client 110, attempting to access network 105 via access point 115. In some embodiments, SAE authentication may be performed by access point 115. In other embodiments, SAE authentication may be performed by controller 120. Accordingly, the following figures and description disclosing performance of SAE authentication by access point 115 is non-limiting, and in other embodiments, controller 120 rather than access point 115 may perform the SAE authentication. To access a network, client 110 may send a probe request to discover networks that are security-enabled (e.g., networks that utilize SAE), such as network 105. If SAE capable, access point 115 may respond with a probe response to client 110 that includes a authentication and key management (AKM) having a particular suite type, where the AKM may be indicative of SAE capability.

Client 110 may select an FFC group or an ECC group from one or more FCC or ECC groups configured on client 110. The selected group may be based on a priority or preference. Client 110 may generate a Password Element (PWE) for the selected group using identities of client 110 and access point 115 as well as a password specific to network 105. Client 110 may generate two additional random numbers, rand and mask, in order generate a scalar using the rand and the mask, and an element using the mask and PWE. Client 110 may then transmit a commit message to access point 115 that includes the scalar, the element, and the selected FFC or ECC group.

On receiving the commit message, access point 115 determines whether a number of SAE open or ongoing sessions at access point 115 is greater than or equal to a threshold indicative of a potential attack. If the number of SAE open or ongoing sessions is greater than or equal to the threshold, an SAE anti-clogging mechanism may be triggered. For typical SAE anti-clogging mechanisms, access point 115 generates an anti-clogging token that is transmitted within a reject commit message to client 110. Client 110 is then expected to transmit back to access point 115 the same anti-clogging token (e.g., replay the anti-clogging token). Thus, when access point 115 receives the same anti-clogging token it initially transmitted to client 110, client 110 may be authenticated and proceed to associate with access point 115 to gain access to network 105.

It has been assumed an attacker, such as attacker 125, is not intelligent enough to replay the anti-clogging token and thus, only legitimate clients such as client 110 will be authenticated. However, this assumption is incorrect. The anti-clogging token transmitted within the commit message from access point 115 to client 110 is unencrypted. Therefore, attacker 125 may intercept the message and store the anti-clogging token. In some examples, attacker 125 can intercept and store a plurality of anti-clogging tokens and transmit them back to access point 115 simultaneously for different client Media Access Control (MAC) addresses to simulate a plurality of clients accessing network 105 at a same time. This may cause resource exhaustion, a form of denial-of-service attack, at access point 115. Resource exhaustion may prevent legitimate clients, such as client 110, from accessing network 105 via access point 115.

Embodiments as disclosed herein provide a more secure SAE anti-clogging mechanism to overcome the above-discussed vulnerabilities. For example, as described in greater detail with respect to the following figures, when the commit message is received from client 110 at access point 115 and the anti-clogging mechanism is triggered by access point 115 upon a determination that the number of SAE open or ongoing sessions is above the threshold, client 110 rather than access point 115 may generate a first anti-clogging token. Client 110 may be prompted to generate the first anti-clogging token based on a unique status code received in a rejected commit message transmitted from access point 115 to client 110. The first anti-clogging token generated by client 110 may be computed using two variables, a shared secret (e.g., a DH computation output) and a multiplier. Client 110 may transmit the first anti-clogging token to access point 115. Access point 115 may generate a second anti-clogging token that is computed using two variables, a shared secret (e.g., a DH computation output) and the multiplier. Access point 115 may then verify that the first and second anti-clogging tokens match to authenticate client 110.

The shared secret used to compute the first anti-clogging token and the second anti-clogging token may be an identical shared secret. For example, both access point 115 and client 110 may generate a private key and a public key derived from the private key. Access point 115 and client 110 may exchange public keys. Accordingly, client 110 may have its private key and the access point's public key, while access point 115 may have its private key and the client's public key. The shared secret used to compute the first anti-clogging token may be produced at client 110 by performing a DH computation using the client's private key and the access point's public key. An identical shared secret used to compute the second anti-clogging token may be produced at access point 115 by performing a DH computation using the access point's private key and the client's public key.

The multiplier of the first anti-clogging token and the second anti-clogging token may be a same value when the client 110 is a legitimate client. For example, the multiplier may be computed by hashing a password specific to network 105, among other values. The password is known to client 110 and access point 115, but not known to attacker 125. Therefore, even if attacker 125 attempts to pose as client 110 by generating and transmitting an anti-clogging token to access point 115, the attacker-generated anti-clogging token will lack the appropriate multiplier and not match the controller-generated anti-clogging token. Resultantly, attacker 125 will not be authenticated.

If the first and second anti-clogging tokens match indicating client 110 is legitimate, the SAE authentication process may continue as described in greater detail with respect to FIG. 4 below. Once SAE authentication has been successfully completed, client 110 and access point 115 may undergo association followed by a four-way handshake mechanism.

The elements described above of operating environment 100 (e.g., network 105, client 110, access point 115, controller 120, and attacker 125) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 7, the elements of operating environment 100 may be practiced in a computing device 700.

While network 105 in operating environment 100 is described as a WLAN, embodiments of the secure SAE anti-clogging mechanism, as described herein, may also be applied to other networks utilizing SAE for authentication.

Figure 2:
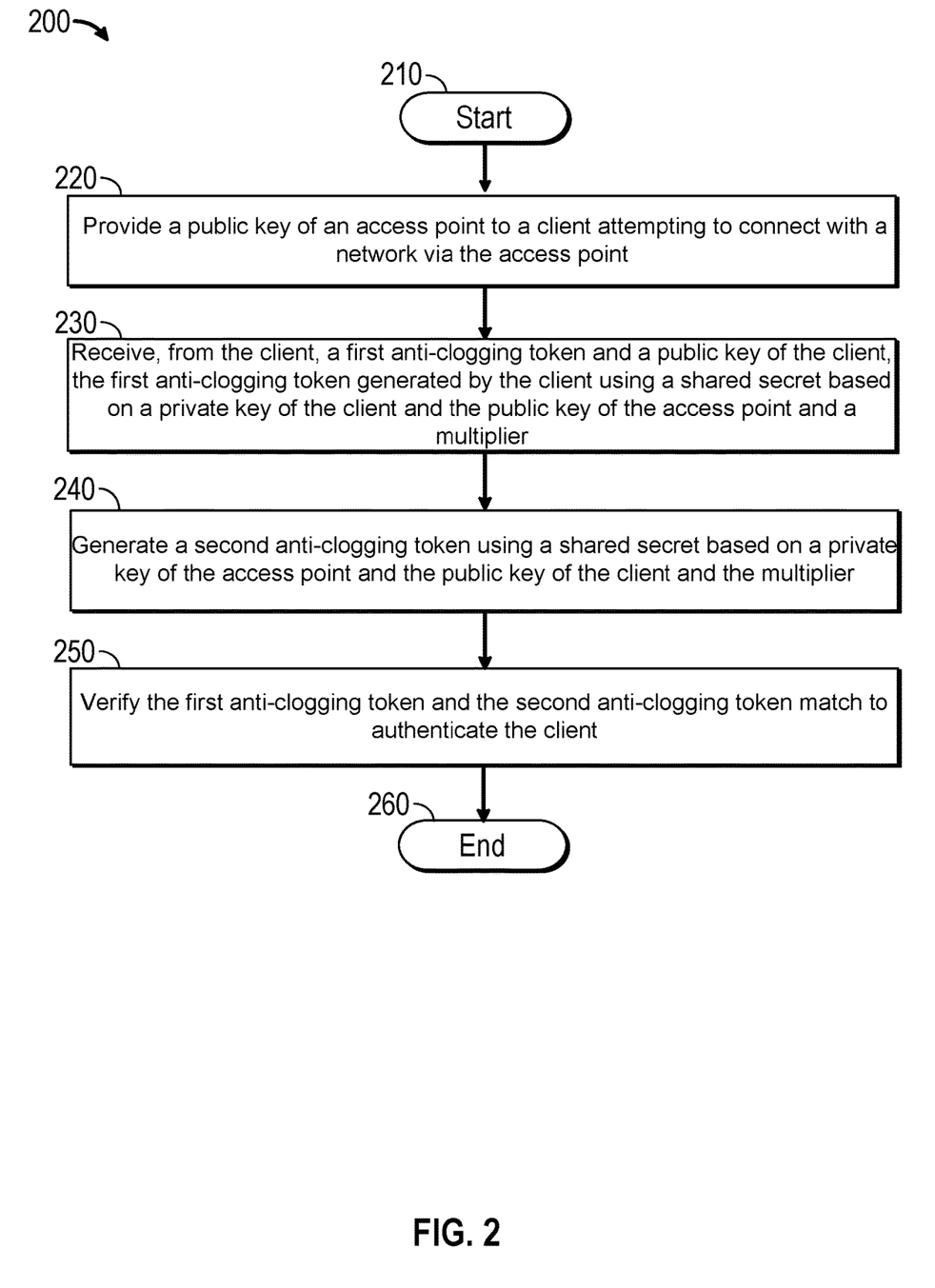
FIG. 2 is a flow chart of a method for implementing a secure SAE anti-clogging mechanism performed by an access point.

FIG. 2 is a flow chart setting forth the general stages involved in a method 200 consistent with embodiments of the disclosure for implementing a secure SAE anti-clogging mechanism. Method 200 may be implemented by access point 115 of network 105 that client 110 is attempting to associate with to connect to network 105. Ways to implement the stages of method 200 will be described in greater detail below.

Method 200 may begin at starting block 210 and proceed to stage 220 where access point 115 may provide a public key of access point 115, hereinafter referred to as AP public key (Y), to client 110. Access point 115 may derive the AP public key (Y) from a private key of access point 115, hereinafter referred to as AP private key (y). AP private key (y) may be a randomly generated value.

From stage 220, where AP public key (Y) is provided to client 110, method 200 may advance to stage 230 where access point 115 receives a first anti-clogging token and a public key of the client, hereinafter referred to as client public key (X). The first anti-clogging token may be generated by client 110 and may be computed using two variables, a shared secret and a multiplier. The shared secret may be a DH computation output produced using client private key (x) generated by client 110 and the AP public key (Y) received at stage 220. The multiplier may be a password seed computed by hashing at least a MAC address of access point 115, a MAC address of client 110, and a password specific to network 105. For example, the password specific to network 105 may be a WLAN password. The password specific to network 105 may be known to legitimate clients, such as client 110, and access point 115, but is not known to attackers, such as attacker 125. In some embodiments, the first anti-clogging token may be a product of the DH computation output and the password seed (e.g., the DH computation output may be multiplied by the password seed to generate the first anti-clogging token).

Once the access point 115 receives the first anti-clogging token and the client public key (X) at stage 230, method 200 may proceed to stage 240 where access point 115 generates a second anti-clogging token. The second anti-clogging token may be computed using two variables, a shared secret and the multiplier. The shared secret may be a DH computation output produced using the AP private key (y) generated by access point 115 and the client public key (X) received at stage 230. The shared secret may be identical to the shared secret produced at client 110. The multiplier may be a password seed that is computed in a same manner and has a same value as the password seed computed at client 110. For example, the password seed may be computed by hashing at least the MAC address of access point 115, the MAC address of client 110, and the password specific to network 105. In some embodiments, the second anti-clogging token may be a product of the DH computation output and the password seed (e.g., the DH computation output may be multiplied by the password seed to generate the second anti-clogging token).

After access point 115 generates the second anti-clogging token at stage 240, method 200 may advance to stage 250 where a verification that the first anti-clogging token and the second anti-clogging token match is performed to authenticate the client. The first anti-clogging token and the second anti-clogging token may match because they each include the identical shared secret and the multiplier of the same value. Once the first anti-clogging token and second anti-clogging token have been verified to match at stage 250, method 200 may then end at stage 260.

In some embodiments, the first anti-clogging token and the second anti-clogging token may not match. For example, the first anti-clogging token may actually be generated and transmitted to access point 115 by attacker 125. However attacker 125 does not have knowledge of the password specific to network 105. Therefore, the multiplier computed by attacker 125 cannot be a same multiplier computed by access point 115. Accordingly, the first anti-clogging token and the second anti-clogging token cannot match, and attacker 125 will not be authenticated.

In other embodiments, method 200 may be implemented by controller 120 of network 105 rather than access point 115. In such embodiments, the public key provided to client 110 may be a public key of controller 120, and the first anti-clogging token received at controller 120 may be generated by client 110 using a shared secret based on the client private key (x) and the public key of controller 120 and the multiplier. Additionally, the second anti-clogging token may be generated by controller 120 using a shared secret based on a private key of controller 120 and the client public key (X) and the multiplier.

Figure 3:
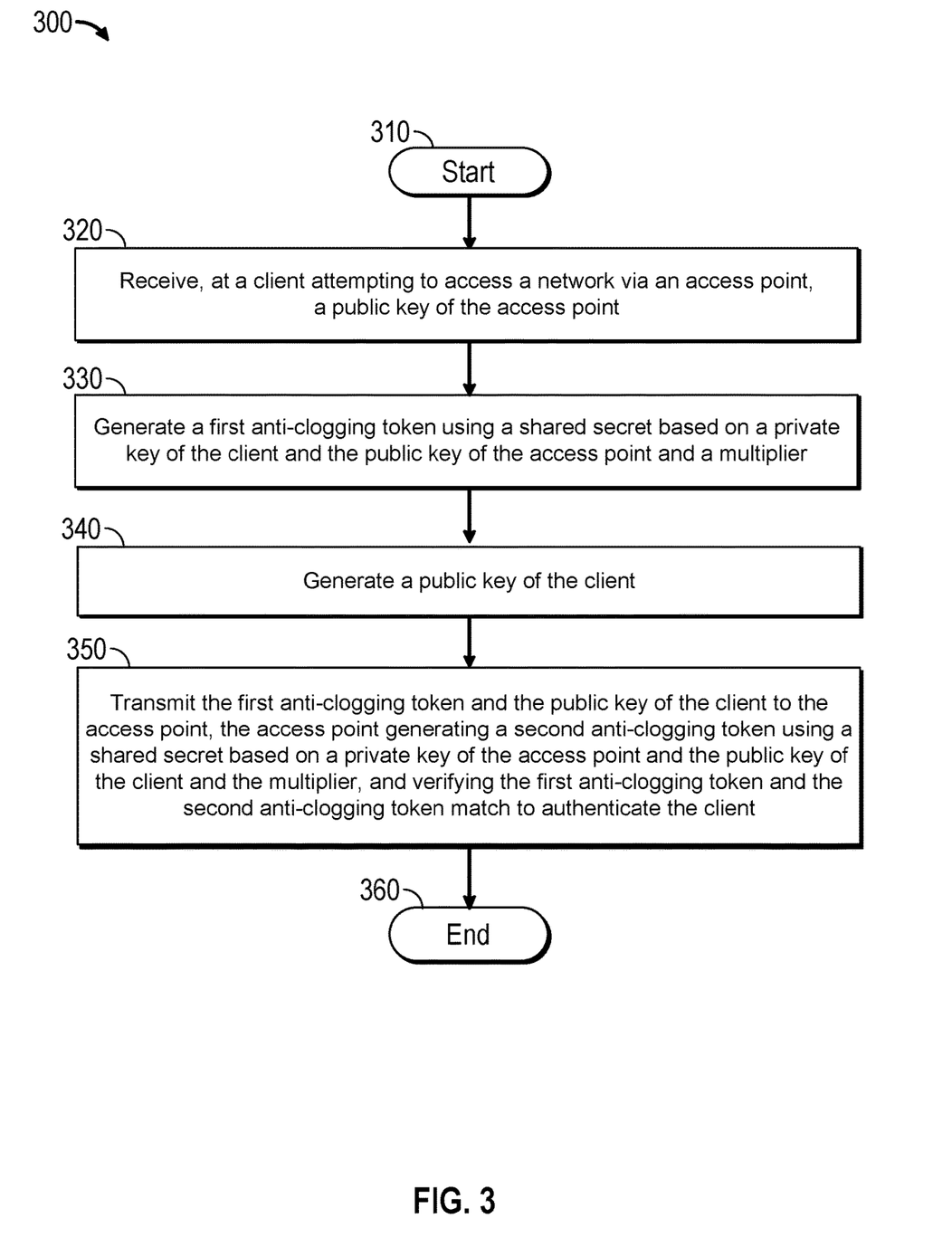
FIG. 3 is a flow chart of a method for implementing a secure SAE anti-clogging mechanism performed by a client.

FIG. 3 is a flow chart setting forth the general stages involved in a method 300 consistent with embodiments of the disclosure for implementing a secure SAE anti-clogging mechanism. Method 300 may be implemented by client 110 attempting to access network 105 via access point 115. Ways to implement the stages of method 300 will be described in greater detail below.

Method 300 may begin at starting block 310 and proceed to stage 320 where client 110 may receive a AP public key (Y) from access point 115. The AP public key (Y) may be received along with a unique status code in a rejected commit message transmitted from access point 115 in response to receiving a commit message from client 110 and determining that a number of SAE open or ongoing sessions at access point 115 is above a threshold indicative of a potential attack, as described in greater detail with respect to FIG. 4. In some examples, the unique status code may be a new status code 108. In other examples, the unique status code may be comprised of any unique value from a reserved pool. The unique status code may prompt client 110 to generate a first anti-clogging token.

From stage 320, method 300 may advance to stage 330 where client 110 generates the first anti-clogging token and a client public key (X). The first anti-clogging token generated by client 110 may be computed using two variables. The first variable may be a shared secret (e.g., a DH computation output) produced using the client private key (x) generated by client 110 and the AP public key (Y) received at stage 320. The second variable may be a multiplier computed by hashing a MAC address of access point 115, a MAC address of client 110, and a password specific to network 105 that is known to legitimate clients, such as client 110, and access point 115.

At stage 340, client 110 may further generate a client public key (X). Client 110 may derive the client public key (X) from the client private key (x). Client private key (x) may be a randomly generated value by client 110.

Once client 110 generates the first anti-clogging token at stage 330 and the client public key (X) at stage 340, the method 300 may proceed to stage 350 where client 110 may provide the first anti-clogging token and the client public key (X) to access point 115 at stage 350 to authenticate client 110. For example, access point 115 may authenticate client 110 by generating the second anti-clogging token, and verifying the first anti-clogging token and the second anti-clogging token match.

The second anti-clogging token generated by access point 115 may be computed using two variables. The first variable may be a shared secret (e.g., a DH computation output) produced using an AP private key (y) generated by access point 115 and the client public key (X). The shared secret may be identical to the shared secret produced at client 110. The second variable may be a multiplier. The multiplier may be a password seed that is computed in a same manner and comprises a same value as the password seed computed at client 110. For example, the password seed may be computed by hashing at least the MAC address of access point 115, the MAC address of client 110, and the password specific to network 105. Because only a legitimate client, such as client 110, knows the password specific to network 105, only legitimate clients will be able to compute a multiplier identical to the multiplier computed by access point 115 and thus generate a first anti-clogging token that matches the second anti-clogging token (e.g., tokens having identical shared secrets and multipliers). Method 300 performed by client 110 may then end at stage 360.

In other embodiments, client 110 may be interacting with controller 120 rather than access point 115. For example, client 110 may receive a public key of controller 120 and generate a first anti-clogging token using a shared secret based on the client private key (x) and the public key of controller 120 for transmission along with the client public key (X) to controller 120. Controller 120 may then generate a second anti-clogging token using a shared secret based on a private key of controller 120 and the client public key (X), and verify the first and second anti-clogging tokens match.

Figure 4:
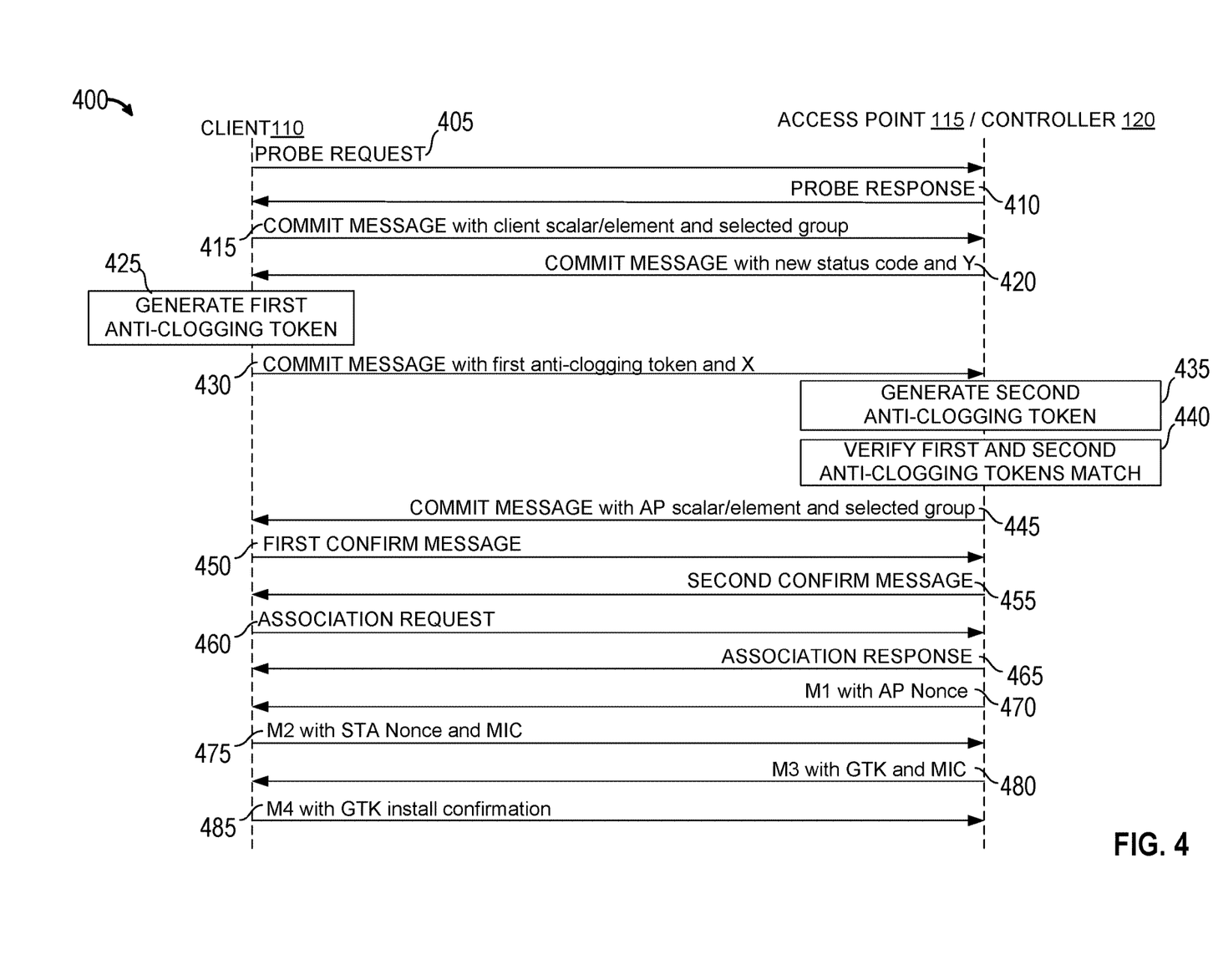
FIG. 4 is a communication diagram illustrating interactions between a client and an access point.

FIG. 4 is a communication diagram 400 illustrating interactions between client 110 and access point 115. In other examples, the interactions described below may occur between client 110 and controller 120, rather than client 110 and access point 115. Client 110 may send a probe request 405 to discover SAE networks. Probe request 405 may be received by one or more access points of one or more networks within a range of client 110, such as access point 115 of network 105. Access point 115 may determine whether it is SAE capable, and if so, access point 115 may respond with a probe response 410 to client 110. Probe response 410 may include an AKM having a particular SuitType, where the AKM may be indicative of SAE capability. As one example, probe response 410 may include an AKM having a SuitType of 8 inside Robust Security Network Information Element (RSN-IE).

Upon receiving probe response 410, client 110 may select a FFC group or an ECC group from one or more FCC or ECC groups configured on client 110. The selected group may be based on a priority or preference. Client 110 may generate a PWE for the selected group using identities of client 110 and access point 115 as well as a password specific to network 105. Client 110 may generate two additional random numbers, rand and mask, in order generate a scalar using the rand and the mask, and an element using the mask and PWE. Client 110 may then transmit an initial commit message 415 to access point 115 that includes the scalar, the element, and the selected FFC or ECC group.

On receiving initial commit message 415, access point 115 determines a number of SAE open or ongoing sessions at access point 115. A threshold indicative of a potential attack is configured by controller 120 such that if the number of SAE open or ongoing sessions determined is greater than or equal to the threshold, an SAE anti-clogging mechanism may be triggered. When triggered, access point 115 may generate an AP private key (y) and AP public key (Y) and reject commit message 415. For example, access point 115 may transmit a reject commit message 420 to client 110 that includes a new status code (e.g., code 108) or any other unused value from a reserved pool along with the AP public key (Y) generated by access point 115. The new status code may indicate that the secure anti-clogging mechanism described in embodiments herein is to be followed and enforced. For example, on receiving reject commit message 420 from access point 115, the new status code may prompt client 110 to generate a first anti-clogging token.

Client 110 may generate the first anti-clogging token at operation 425. For example, a DH computation is performed using a client private key (x) generated by client 110 and the AP public key (Y) received within reject commit message 420. An output of the DH computation is then multiplied by a password seed to generate the first anti-clogging token. The password seed may be computed by hashing a MAC address of access point 115, a MAC address of client 110, and the password specific to network 105 (e.g. a WLAN password). The password is unique to network 105 and allows clients, such as client 110 to connect to network 105. The password is known to legitimate clients as well as access points of network 105, including access point 115, and controller 120.

Client 110 may also derive a client public key (X) using the client private key (x) and a generator function G based on ECC group, for example. Client 110 may then send back to access point 115 a modified commit message 430 that includes the first anti-clogging token and the client public key (X).

On receiving the modified commit message 430, access point 115 may generate a second anti-clogging token at operation 435. For example, a DH computation may be performed using the AP private key (y) generated by access point 115 and the client public key (X) received with modified commit message 430. An output of the DH computation is then multiplied by a password seed computed by hashing the MAC address of access point 115, the MAC address of client 110, and the password specific to network 105 to generate the second anti-clogging token.

At operation 440, access point 115 may verify that the first anti-clogging token received within modified commit message 430 and the second anti-clogging token generated at operation 435 match. If the tokens do not match, authentication of client 110 may be rejected. For example, the tokens may not match if attacker 125 is generating and transmitting an anti-clogging token to access point 115 under the guise of client 110. The mismatch results from attacker 125 not knowing the password specific to network 105 causing attacker 125 to compute a password seed that cannot be the same as the password seed used to compute of the second anti-clogging token, and therefore a token that cannot match the second anti-clogging token.

If the tokens match, the client 110 may be determined to be a legitimate client and proceed with the SAE authentication. For example, access point 115 may check its configuration to determine the FFC or ECC group selected by client 110 is supported by its configuration, the configuration being pushed by controller 120. Access point 115 may use the password specific to network 105 to generate a PWE (e.g., PWE should be a same PWE generated by client 110 upon receiving probe response 410). Access point 115 may generate two random numbers, rand and mask, in order to generate a scalar using the rand and the mask, and an element using the mask and the PWE. Access point may transmit final commit message 445 to client 110. Final commit message 445 may include the scalar and element generated by access point 115, as well as the selected FFC or ECC group.

SAE authentication may then proceed to a confirm phase. Client 110 may send a first confirm message 450 that includes send-confirm and confirm elements. Client 110 may also compute a Pairwise Master Key (PMK) and Pairwise Master Key Identifier (PMK ID). Access point 115 may then transmit confirm message 455 containing the send-confirm and confirm fields. Access point 115 may also compute the PMK and PMK ID. The PMK computed at client 110 and access point 115 may be a shared secret key, for example.

Following the confirmation phase, association between client 110 and access point 115 may occur. For example, client 110 may transmit an association request 460 to access point 115 in order to access network 105 via access point 115. Access point 115 may transmit back an association response 465 granting client 110 access to network 105 if elements in association request 460 match capabilities of access point 115.

Access point 115 may then initiate a four-way handshake that enables access point 115 and client 110 to prove to each other that they know the PMK (e.g., the shared secret key) without having to disclose the PMK. For example, rather than disclosing the PMK, access point 115 and client 110 may encrypt message to each other that can only be decrypted by using the PMK, and successful decryption proves independent knowledge of the PMK by access point 115 and client 110. The messages may be sent as Extensible Authentication Protocol over IEEE 802 (EAPOL)-key frames.

In an example four-way handshake, access point 115 first transmits a first message (M1) 470 to client 110 that includes a nonce value generated by access point 115 (e.g., AP Nonce). By concatenating the PMK with the AP Nonce received from M1 470 and other attributes, client 110 may derive a Pairwise Transient Key (PTK). The other attributes may include a nonce value generated by client 110 (e.g., STA Nonce), the MAC address of access point 115, and the MAC address of client 110. Client 110 may transmit a second message (M2) 475 to access point 115 that includes the STA Nonce and a message integrity code (MIC) generated to authenticate M2 475.

After authenticating M2 475 based on the MIC, access point 115 may derive the PTK by concatenating the PMK with the STA Nonce received from M2 475, the AP Nonce, and the MAC addresses of access point 115 and client 110. Access point 115 may construct a Group Temporal Key (GTK) used to decrypt multicast and broadcast traffic. The GTK may be encrypted using the derived PTK.

Access point 115 may transmit a third message (M3) 480 to client 110 that includes the GTK and a MIC generated by access point 115 to authenticate M3 480. After authenticating M3 480 based on the MIC, client 110 may install the GTK and transmit a fourth message (M4) 485 to the access point 115 to confirm that the GTK has been installed.

Figure 5:
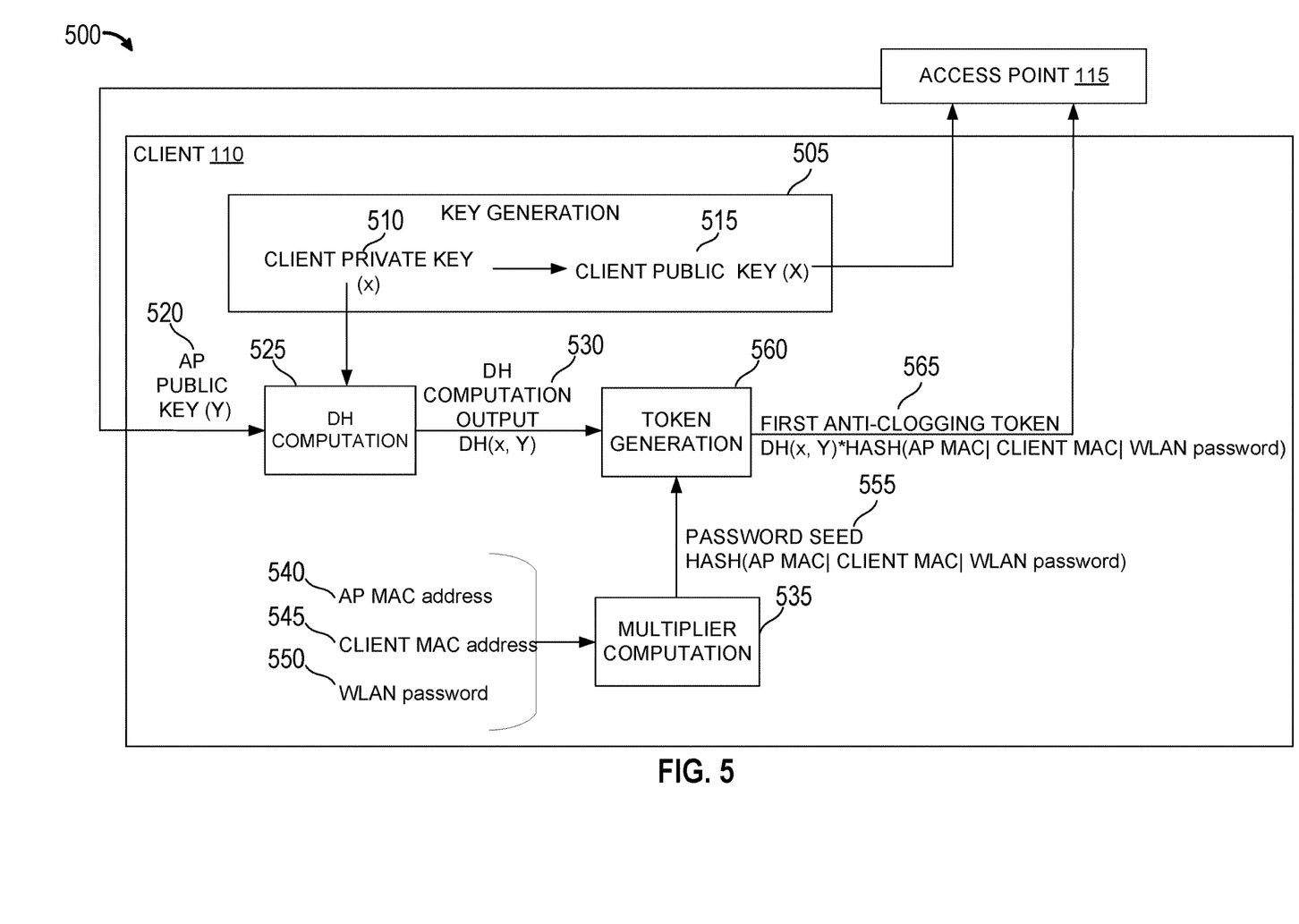
FIG. 5 is a conceptual diagram illustrating portions of a secure SAE anti-clogging mechanism performed by a client.

FIG. 5 is a conceptual diagram 500 illustrating portions of a secure SAE anti-clogging mechanism performed by client 110. Client 110 may generate private and public keys at key generation operation 505. For example, client 110 may generate a client private key (x) 510 based on a randomly generated value. Client 110 may then derive a client public key (X) 515 from client private key (x) 510.

Upon receiving an AP public key (Y) 520 at client 110, client 110 performs a DH computation at operation 525 using client private key (x) 510 and AP public key (Y) 520 to produce a DH computation output 530. DH computation output 530 may be a shared secret expressed as $DH(x, Y)$. Additionally, client 110 performs a multiplier computation at operation 535. The multiplier computation comprises hashing at least a MAC address of access point 115 (e.g. AP MAC address 540), a MAC address of client 110 (e.g. CLIENT MAC address 545), and a password specific to network 105 (e.g., WLAN password 550) to generate a password seed 555. Password seed 555 may be expressed as HASH(AP MAC| CLIENT MAC| WLAN password).

At operation 560, a first anti-clogging token 565 may be generated by multiplying DH computation output 530 and password seed 555. First anti-clogging token 565 may be expressed as $DH(x, Y)*HASH(AP\ MAC|\ CLIENT\ MAC|\ WLAN\ password)$. Client 110 may transmit first anti-clogging token 565 to access point 115, along with client public key (X) 515.

In other embodiments, client 110 may receive a public key of controller 120. An output of a DH computation performed at operation 525 using client private key (x) 510 and the public key of controller 120 may be multiplied by password seed 555 to generate an anti-clogging token at operation 560 that may be transmitted to controller 120 along with client public key (X) 515.

Figure 6:
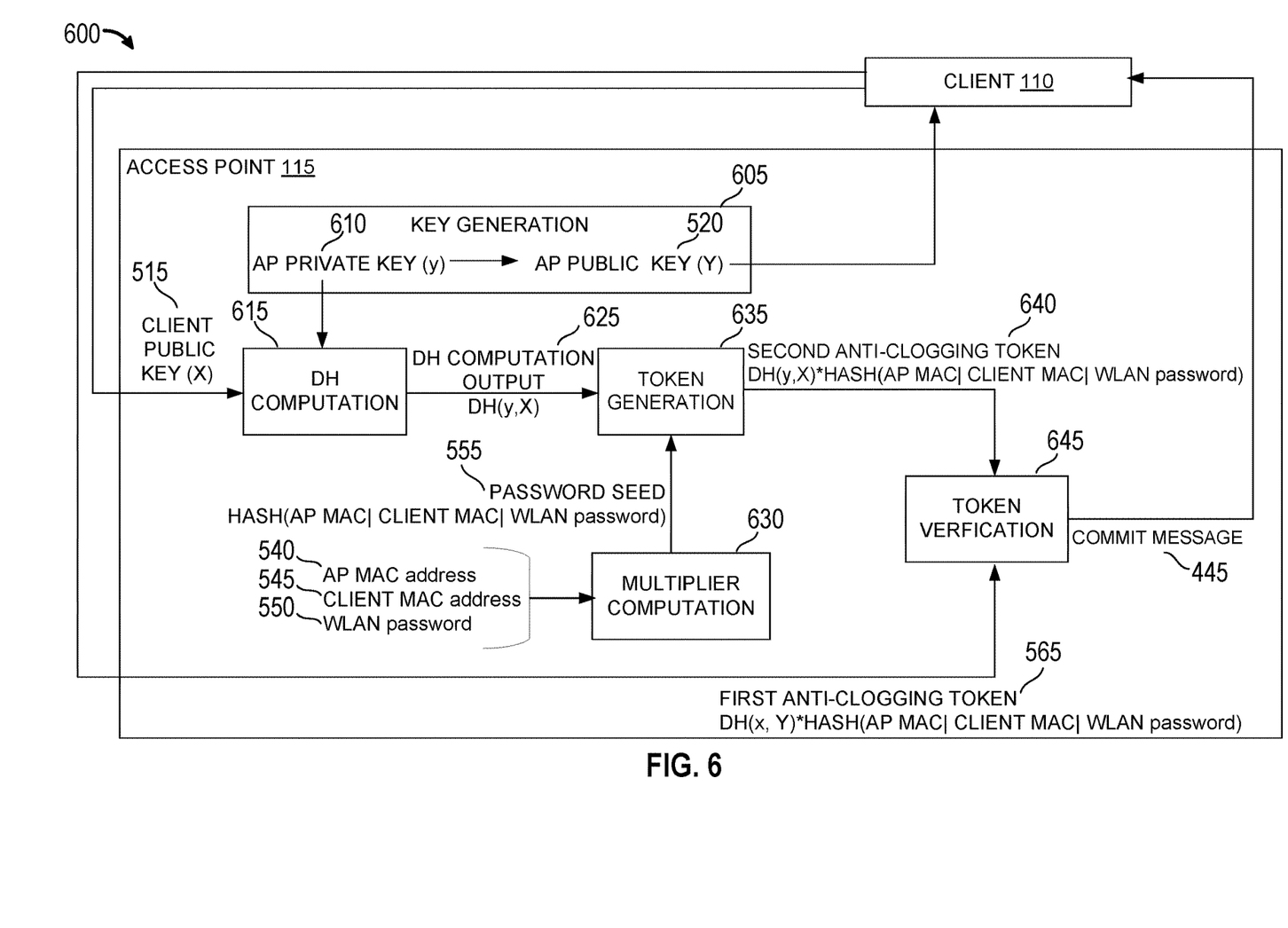
FIG. 6 is a conceptual diagram illustrating portions of a secure SAE anti-clogging mechanism performed by an access point.

FIG. 6 is a conceptual diagram 600 illustrating portions of a secure SAE anti-clogging mechanism performed by access point 115. Access point 115 may generate private and public keys at key generation operation 605. For example, access point 115 may generate an AP private key (y) 610 based on a randomly generated value. Access point 115 may then derive AP public key (Y) 520 from AP private key (y) 610. Access point 115 may provide AP public key 520 to client 110, and client 110 may utilize the AP public key 520 as described above with respect to FIG. 5. In response, access point 115 may then receive first anti-clogging token 565 and client public key (X) 515 generated by client 110.

Access point 115 may perform a DH computation at operation 615 using AP private key (y) 610 and client public key (X) 515 to produce a DH computation output 625. DH computation output 625 may be a shared secret expressed as $DH(y, X)$. DH computation output 625 may be a shared secret identical to DH computation output 530. Additionally, access point 115 performs a multiplier computation at operation 630. The multiplier computation may be a same computation performed by client 110 at operation 535. For example, the multiplier computation comprises hashing at least AP MAC address 540, CLIENT MAC address 545, and WLAN password 550 to generate password seed 555 expressed as HASH(AP MAC| CLIENT MAC| WLAN password).

At operation 635, a second anti-clogging token 640 may be generated by multiplying DH computation output 625 and password seed 555. Second anti-clogging token 640 may be expressed as DH(x, Y)*HASH(AP MAC| CLIENT MAC| WLAN password).

At operation 645, access point 115 may verify first anti-clogging token 565 received from client 110 and second anti-clogging token 640 generated by access point 115 match. If first anti-clogging token 565 and second anti-clogging token 640 match, SAE authentication may proceed. For example, as described in greater detail with respect to FIG. 4 access point 115 may transmit final commit message 445 to client 110 to enter a confirmation phase. Once the confirmation phase is complete, client 110 may be authenticated, and client 110 and access point 115 may then proceed with association and the four-way handshake.

In some embodiments, the tokens may not match at operation 645. For example, an anti-clogging token received at access point 115 may actually be generated and transmitted by attacker 125 posing as client 110. However, attacker 125 does not have knowledge of WLAN password 550 used by access point 115 to compute password seed 555 and thus cannot generate an anti-clogging token that will match second anti-clogging token 640. Accordingly, attacker 125 cannot be authenticated.

In other embodiments, the portions of the secure SAE anti-clogging mechanism illustrated in diagram 600 may be performed by controller 120 rather than access point 115. For example, the public key provided to client 110 may be a public key of controller 120, and an anti-clogging token received at controller 120 may be generated by client 110 by multiplying an output of a DH computation performed based on client private key (x) 510 and the public key of controller 120 and password seed 555. Additionally, an output of a DH computation performed by controller 120 using client private key (x) 510 and the public key of controller 120 may be multiplied by password seed 555 to generate another anti-clogging token, where a verification that the anti-clogging tokens match can be performed to authenticate client 110.

According to some example embodiments, a public key of an access point may be provided to a client attempting to connect with a network via the access point, and a first anti-clogging token and a public key of the client may be received from the client. The first anti-clogging token may be generated by the client using a shared secret based on a private key of the client and the public key of the access point and a multiplier. Then, a second anti-clogging token may be generated using a shared secret based on a private key of the access point and the public key of the client and the multiplier, and the first anti-clogging token and the second anti-clogging token may be verified to match to authenticate the client.

In other example embodiments, a DH computation may be performed using the private key of the access point and the public key of the client to produce a DH computation output, where the DH computation output may be the shared secret used to generate the second anti-clogging token. The multiplier may be a password seed and the DH computation output may be multiplied by the password seed to generate the second anti-clogging token. The password seed may be computed by hashing at least a media access control (MAC) address of the access point, a MAC address of the client, and a password specific to the network. The password specific to the network may be known to a legitimate client and the access point, and not known to an attacker.

In further example embodiments, the client may be determined to be a legitimate client and the client may be authenticated responsive to verifying that the first anti-clogging token and the second anti-clogging token match. The client may be determined to be an attacker and authentication of the client may be rejected responsive to a determination that the first anti-clogging token and the second anti-clogging token do not match. A commit message may be received from the client, a number of SAE open sessions at the access point may be determined to be greater than or equal to a threshold indicative of an attack, and responsive to the determination, a reject commit message may be transmitted to the client that include a unique status code and the public key of the access point, the unique status code prompting the client to generate the first anti-clogging token.

According to other example embodiments, an apparatus may include a memory storage, and a processing unit coupled to the memory storage. The processing unit may be operative to provide a public key of an access point to a client attempting to connect with a network via the access point, and receive, from the client, a first anti-clogging token and a public key of the client. The first anti-clogging token may be generated by the client using a shared secret based on a private key of the client and the public key of the access point and a multiplier. The processing unit may be further operative to generate a second anti-clogging token using a shared secret based on a private key of the access point and the public key of the client and the multiplier, and verify the first anti-clogging token and the second anti-clogging token match to authenticate the client.

According to other example embodiments, a public key of an access point may be received at a client attempting to access a network via the access point. A first anti-clogging token may be generated using a shared secret based on a private key of the client and the public key of the access point and a multiplier, and a public key of the client may be generated. The first anti-clogging token and the public key of the client may be generated to the access point, the access point generating a second anti-clogging token using a shared secret based on a private key of the access point and the public key of the client and the multiplier, and verifying the first anti-clogging token and the second anti-clogging token match.

Figure 7:
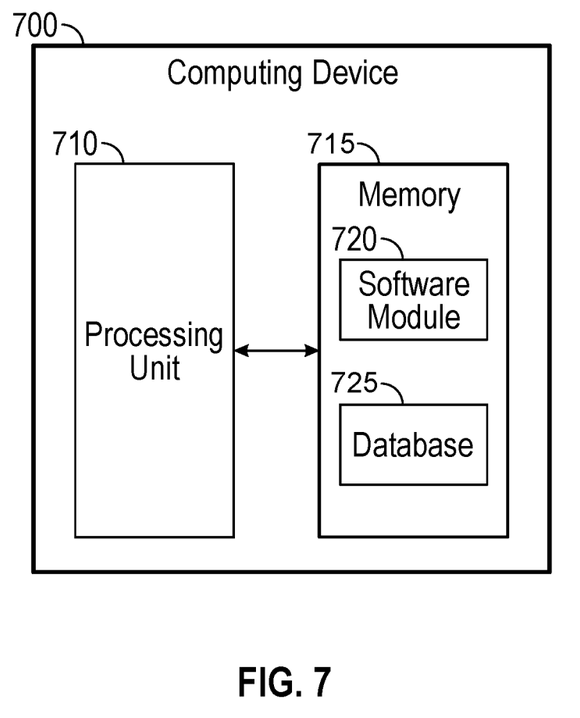
FIG. 7 is a block diagram of a computing device.

FIG. 7 shows computing device 700. As shown in FIG. 7, computing device 700 may include a processing unit 710 and a memory unit 715. Memory unit 715 may include a software module 720 and a database 725. While executing on processing unit 710, software module 720 may perform, for example, processes for a secure SAE anti-clogging mechanism, including for example, any one or more of the stages from method 200 described above with respect to FIG. 2 or method 300 described above with respect to FIG. 3. Computing device 700, for example, may provide an operating environment for elements of operating environment 100 including, but not limited to, network 105, client 110, access point 115, controller 120, and attacker 125. Elements of operating environment 100 (e.g., network 105, client 110, access point 115, controller 120, and attacker 125) may operate in other environments and are not limited to computing device 700.

Computing device 700 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 700 may comprise any computer operating environment, such as hand-held devices, multi-processor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a Read-Only Memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a System-On-a-Chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
providing a public key of an access point to a client attempting to connect with a network via the access point;
receiving, from the client, a first anti-clogging token and a public key of the client, the first anti-clogging token generated by the client using a first shared secret and a multiplier, the first shared secret being based on a private key of the client and the public key of the access point, wherein receiving the first anti-clogging token and the public key of the client comprises receiving the first anti-clogging token and the public key of the client in response to sending a reject commit message to the client as a response to a commit message received from the client;
generating a second anti-clogging token using a second shared secret and the multiplier, the second shared secret being based on a private key of the access point and the public key of the client; and
determining that the first anti-clogging token matches with the second anti-clogging token match.

2. The method of claim 1, wherein generating the second anti-clogging token comprises:
performing a Diffie-Hellman (DH) computation using the private key of the access point and the public key of the client to produce a DH computation output, wherein the DH computation output is the second shared secret used to generate the second anti-clogging token.

3. The method of claim 1, wherein the multiplier is a password seed and generating the second anti-clogging token comprises:
multiplying the second shared secret by the password seed to generate the second anti-clogging token.

4. The method of claim 3, further comprising:
computing the password seed by hashing at least a Media Access Control (MAC) address of the access point, a MAC address of the client, and a password specific to the network.

5. The method of claim 4, wherein the password specific to the network is known to a legitimate client and the access point, and not known to an attacker.

6. The method of claim 1, further comprising:
responsive to determining that the first anti-clogging token matches with the second anti-clogging token, determining the client is a legitimate client and authenticating the client.

7. The method of claim 1, further comprising:
responsive to determining that the first anti-clogging token does not match with the second anti-clogging token, determining the client is an attacker and rejecting authentication of the client.

8. The method of claim 1, further comprising:
receiving the commit message from the client;
determining a number of Simultaneous Authentication of Equal (SAE) open sessions at the access point is greater than or equal to a threshold indicative of an attack; and
responsive to the determination, transmitting the reject commit message to the client, wherein the reject commit message comprises a unique status code and the public key of the access point, the unique status code prompting the client to generate the first anti-clogging token.

9. An apparatus comprising:
a memory storage; and
a processing unit coupled to the memory storage, wherein the processing unit is operative to:
provide a public key of an access point to a client attempting to connect with a network via the access point;
receive, from the client, a first anti-clogging token and a public key of the client, the first anti-clogging token generated by the client using a first shared secret and a multiplier, wherein the first shared secret is based on a private key of the client and the public key of the access point, wherein the processing unit being operative to receive the first anti-clogging token and the public key of the client comprises the processing unit being operative to receive the first anti-clogging token and the public key of the client in response to sending a reject commit message to the client as a response to a commit message received from the client;
generate a second anti-clogging token using a second shared secret and the multiplier, wherein the second share secret is based on a private key of the access point and the public key of the client; and
determine that the first anti-clogging token is a match with the second anti-clogging token.

10. The apparatus of claim 9, wherein to generate the second anti-clogging token, the processing unit is operative to:
perform a Diffie-Hellman (DH) computation using the private key of the access point and the public key of the client to produce a DH computation output, wherein the DH computation output is the second shared secret used to generate the second anti-clogging token;
compute a password seed by hashing a Media Access Control (MAC) address of the access point, a MAC address of the client, and a password specific to the network, wherein the password seed is the multiplier; and
multiply the DH computation output by the password seed to generate the second anti-clogging token.

11. The apparatus of claim 10, wherein the second shared secret of the second anti-clogging token is identical to the shared secret of the first anti-clogging token.

12. The apparatus of claim 11, wherein the password specific to the network is known to a legitimate client and the access point such that the multiplier of the first anti-clogging token and the multiplier of the second anti-clogging token are a same value when the client is the legitimate client.

13. The apparatus of claim 12, wherein when the client is the legitimate client the first anti-clogging token and the second anti-clogging token are generated using an identical shared secret and the multiplier of the same value causing the first anti-clogging token and the second anti-clogging token to match.

14. The apparatus of claim 9, wherein the processing unit is operative to derive the public key of the access point from the private key of the access point, and the private key of the access point is a randomly generated value.

15. The apparatus of claim 9, wherein the apparatus is a controller that manages the access point, the public key provided to the client is a public key of the controller such that the first anti-clogging token is generated by the client using a shared secret based on the private key of the client and the public key of the controller and the multiplier, and the second anti-clogging token is generated using a shared secret based on a private key of the controller and the public key of the client and the multiplier.

16. A method comprising:
receiving, at a client attempting to access a network via an access point, a public key of the access point;
generating a first anti-clogging token using a first shared secret and a multiplier, the first shared secret being based on a private key of the client and the public key of the access point, wherein generating the first anti-clogging token comprises generating the first anti-clogging token in response to receiving a reject commit message from the access point as a response to a commit message sent from the client;
generating a public key of the client; and
transmitting the first anti-clogging token and the public key of the client to the access point, the access point generating a second anti-clogging token using a second shared secret and the multiplier, the second secret being based on a private key of the access point and the public key of the client and the multiplier, and determining that the first anti-clogging token is a match with the second anti-clogging token.

17. The method of claim 16, wherein generating the first anti-clogging token comprises:
performing a Diffie-Hellman (DH) computation using the private key of the client and the public key of the access point to produce a DH computation output, wherein the DH computation output is the first shared secret used to generate the first anti-clogging token;

computing a password seed for use as the multiplier by hashing at least a Media Access Control (MAC) address of the access point, a MAC address of the client, and a password specific to the network; and multiplying the DH computation output by the password seed to generate the second anti-clogging token.

18. The method of claim 17, wherein the password specific to the network is known to a legitimate client and the access point, and not known to an attacker such that a match of the first anti-clogging token and the second anti-clogging token indicates the client is the legitimate client.

19. The method of claim 16, wherein generating the public key of the client comprises:

deriving the public key of the client using the private key of the client, wherein the private key of the client is a randomly generated value.

20. The method of claim 16, wherein receiving the public key of the access point comprises:

providing the commit message to the access point; and receiving the public key of the access point and a unique status code in the reject commit message transmitted by the access point when a number of Simultaneous Authentication of Equal (SAE) open sessions at the access point is determined by the access point to be greater than or equal to a threshold indicative of an attack, wherein the unique status code prompts generation of the first anti-clogging token.

* * * * *